United States Patent
Li et al.

(10) Patent No.: US 9,374,247 B2
(45) Date of Patent: Jun. 21, 2016

(54) CHANNEL ESTIMATION METHOD AND DEVICE

(71) Applicant: China Academy of Telecommunications Technology, Beijing (CN)

(72) Inventors: Xiaojiao Li, Beijing (CN); Ruifeng Li, Beijing (CN); Wenshuo Zhang, Beijing (CN); Rui Shi, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 14/442,723

(22) PCT Filed: Nov. 21, 2013

(86) PCT No.: PCT/CN2013/087547
§ 371 (c)(1),
(2) Date: May 14, 2015

(87) PCT Pub. No.: WO2014/079370
PCT Pub. Date: May 30, 2014

(65) Prior Publication Data
US 2015/0312057 A1    Oct. 29, 2015

(30) Foreign Application Priority Data

Nov. 21, 2012    (CN) .......................... 2012 1 0477611

(51) Int. Cl.
*H04L 25/02*    (2006.01)
*H04L 27/26*    (2006.01)

(52) U.S. Cl.
CPC .......... *H04L 25/0228* (2013.01); *H04L 25/022* (2013.01); *H04L 25/0202* (2013.01);

(Continued)

(58) Field of Classification Search
CPC ............ H04L 25/0202; H04L 25/0212; H04L 25/022; H04L 25/024; H04L 27/2695; H04L 25/0228; H04L 25/0232
USPC ................... 375/260, 316, 340, 350; 370/491
See application file for complete search history.

(56) References Cited

U.S. PATENT DOCUMENTS

| 7,830,972 B2 * | 11/2010 | Kwon ................. H04L 25/0232 375/260 |
| 2003/0072254 A1 * | 4/2003 | Ma .......................... H04B 7/04 370/208 |

(Continued)

FOREIGN PATENT DOCUMENTS

| CN | 101414986 A | 4/2009 |
| CN | 102130860 A | 7/2011 |

(Continued)

OTHER PUBLICATIONS

International Search Report for PCT/CN2013/087547.

(Continued)

*Primary Examiner* — Betsy Deppe
(74) *Attorney, Agent, or Firm* — Kilpatrick Townsend & Stockton LLP

(57) ABSTRACT

A channel estimation method including: a channel estimation device employs a two-dimensional channel estimation method and utilizes the channel estimate of an original pilot frequency to conduct channel estimation on an encrypted pilot frequency, so as to obtain the channel estimate of the encrypted pilot frequency; the channel estimation device employs a one-dimensional channel estimation method and utilizes the channel estimate of the encrypted pilot frequency to conduct channel estimation on all resources, so as to obtain the channel estimates on all resources.

20 Claims, 3 Drawing Sheets

A channel estimation device performs channel estimation on encrypted pilots using channel estimation values of original pilots through two-dimension channel estimation to derive channel estimation values of the encrypted pilots — 101

The channel estimation device performs channel estimation on all the resources using the channel estimation values of the encrypted pilots through one-dimension channel estimation to derive channel estimation values over all the resources — 102

(52) U.S. Cl.
CPC ........ *H04L25/0232* (2013.01); *H04L 25/0234* (2013.01); *H04L 27/2695* (2013.01); *H04L 25/0222* (2013.01)

(56) References Cited

U.S. PATENT DOCUMENTS

| | | | |
|---|---|---|---|
| 2008/0123758 A1* | 5/2008 | Paik | H04L 25/0232 375/260 |
| 2011/0206146 A1* | 8/2011 | Eitan | H04L 25/0212 375/260 |

FOREIGN PATENT DOCUMENTS

| | | |
|---|---|---|
| CN | 102325101 A | 1/2012 |
| CN | 102571650 A | 7/2012 |
| EP | 2 515 570 A1 | 10/2012 |
| WO | 9859450 A1 | 12/1998 |
| WO | 2007/129944 A1 | 11/2007 |

OTHER PUBLICATIONS

Amir H Khans Han et al: "Performance evaluation of two-dimensional interpolations on OFDM channel estimation", Telecommunication Networks and Applications Conference, 2007. ATNAC 2007. Australasian, IEEE, Piscataway, NJ, USA, Dec. 2, 2007, pp. 460-464, XP031356843, ISBN: 978-1-4244-1557-1.

The Partial Supplementary European Search Report issued on Oct. 23, 2015 in the EP counterpart application (13856230.1).

The Extended European Search Report issued on Dec. 22, 2015 in the EP counterpart application (13856230.1).

* cited by examiner

◻ Point of original pilot

◨ Point of encrypted pilot

⊟ Original pilot

◨ Encrypted pilot coinciding with original pilot

◩ Encrypted pilot non-coinciding with original pilot

CHANNEL ESTIMATION METHOD AND DEVICE

FIELD OF THE INVENTION

The present invention relates to the field of communications and particularly to a channel estimation method and device.

BACKGROUND OF THE INVENTION

Channel estimation refers to a process of obtaining space channel information from a known transmitted pilot, a time-frequency location at which the pilot is transmitted, and a data signal received at the time-frequency location. Taking a Long Term Evolution (LTE) downlink system as an example, if a downlink pilot transmission sequence is represented as S, a received signal is represented as Y, and a space frequency channel is represented as H+n, where H represents an impulse response of a radio fading channel, and n represents a Gaussian white noise, then Y=(H+n)·S, so that frequency channels at resource locations where all the downlink pilots are located can be estimated as $\hat{H}$=H+n=Y/S. After $\hat{H}$ is derived, channels of data resources $\hat{H}_1$ are derived according to correlation between the pilot resources and the data resources, through one-dimension cascaded filtering interpolation, two-dimension filtering interpolation, etc., as commonly applied at present.

One-dimension cascaded filtering interpolation refers to that filtering interpolation is performed on data in a specified region 1 firstly in one dimension (e.g., in one of the time domain and the frequency domain) using pilots in a specified region 2 to derive channel estimation on symbols where the pilots are located, and filter interpolation is performed then in the other dimension (in the other of the time domain and the frequency domain) to derive channel estimation values over all the resources. Taking cascaded filtering interpolation in the time and frequency dimensions as an example, particularly if a filtering matrix in frequency domain is represented as $P_f$, and a filtering matrix in time domain is represented as $P_t$, then firstly frequency domain interpolation and then time domain interpolation is performed for example, so $\hat{H}_1 = P_t \cdot P_f \cdot \hat{H}$.

Two-dimension filtering interpolation refers to that filter interpolation is performed on data in a specified region 1 concurrently in both the dimensions using pilots in a specified region 2 to derive channel estimation values over all the resources. Taking filtering interpolation in both time and frequency dimensions as an example, particularly if a two-dimension filtering matrix in the frequency and time domains is represented as $P_{ft}$, then $\hat{H}_1 = P_{ft} \cdot \hat{H}$.

In one-dimension cascaded filtering interpolation, the information about only the one dimension is used each time interpolation is performed without making full use of the information about the pilots having high correlation around the interpolation points, thus resulting in relatively low precision of channel estimation. In two-dimension filtering interpolation, the matrix in use may be large, thus resulting in a significant calculation effort.

SUMMARY OF THE INVENTION

Embodiments of the invention provide a channel estimation method and device so as to improve the precision of channel estimation.

A channel estimation method includes:
performing, by a channel estimation device, channel estimation on encrypted pilots using channel estimation values of original pilots through two-dimension channel estimation to derive channel estimation values of the encrypted pilots; and
performing, by the channel estimation device, channel estimation on all resources using the channel estimation values of the encrypted pilots through one-dimension channel estimation to derive channel estimation values over all the resources.

A channel estimation device includes:
a first channel estimation module configured to perform channel estimation on encrypted pilots using channel estimation values of original pilots through two-dimension channel estimation to derive channel estimation values of the encrypted pilots; and
a second channel estimation module configured to perform channel estimation on all resources using the channel estimation values of the encrypted pilots through one-dimension channel estimation to derive channel estimation values over all the resources.

The embodiments of the invention can make full use of pilots having high correlation around interpolation points for interpolation calculation to thereby improve the precision of channel estimation. Moreover the embodiments of the invention can lower the complexity of algorithm.

BRIEF DESCRIPTION OF THE DRAWINGS

In order to make the technical solutions of the invention more apparent, the drawings to which reference is made in the description of the embodiments will be described below briefly, and apparently the drawings to be described below are merely illustrative of some of the embodiments of the invention, and those ordinarily skilled in the art can further derive from these drawings other drawings without any inventive effort.

DETAILED DESCRIPTION OF THE EMBODIMENTS

The technical solutions according to the embodiments of the invention will be described below clearly and fully with reference to the drawings in the invention, and apparently the embodiments to be described are only a part but not all of the embodiments of the invention. All the other embodiments which can occur to those ordinarily skilled in the art based upon the embodiments here of the invention without any inventive effort shall fall into the claimed scope of the invention.

Figure 1:
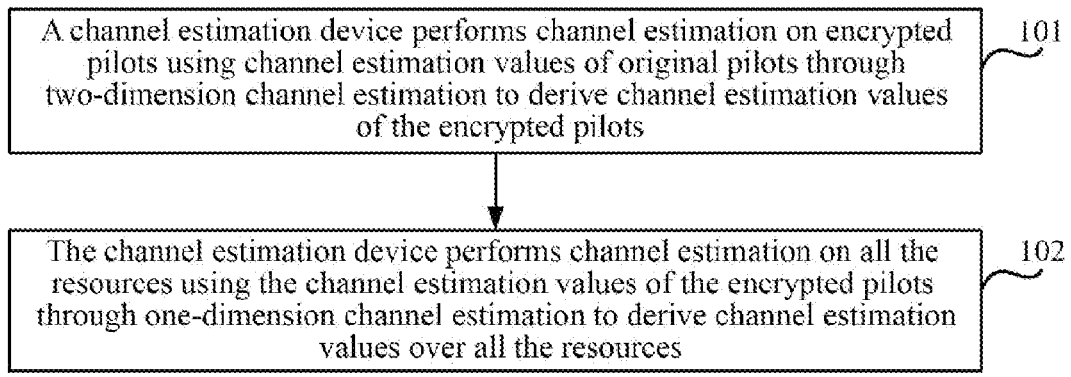
FIG. 1 illustrates a schematic flow chart of a channel estimation method according to an embodiment of the invention.

An embodiment of the invention provides a channel estimation method which can be applicable to uplink and downlink channel estimation processes and to LTE, LTE-Advanced (LTE-A), China Mobile Multimedia Broadcasting (CMMB) and other systems. In the channel estimation process in the application scenario above, the method is used for estimating channel impulse responses (i.e., channel estimation values) of time-frequency resources, where received data are located, according to channel impulse responses (i.e., channel estimation values) of time-frequency resources where transmitted pilots are located. As illustrated in FIG. 1, the channel estimation method includes the following operations:

Operation 101: A channel estimation device performs channel estimation on encrypted pilots using channel estimation values of original pilots through two-dimension channel estimation to derive channel estimation values of the encrypted pilots. The channel estimation values of the encrypted pilots are channel estimation values of a part of resources (referred to as encrypted pilots). In the embodiment of the invention, the channel estimation device can be a base station device.

In the embodiment of the invention, the two-dimension channel estimation is performed in a highly complex and precise algorithm, and two-dimension channel estimation includes but will not be limited to channel estimation using two-dimension filtering interpolation in the time and frequency domains.

In the embodiment of the invention, the original pilots are pilots, specified in a system, for channel estimation. Time-frequency locations of the original pilots are time-frequency locations, specified in the system, for transmitting the pilot signals, and channel information at the time-frequency locations can be derived directly from a known pilot sequence and received signals. The encrypted pilots are signals transmitted over a part of time-frequency locations for data transmission specified in the system. Channel information at the time-frequency locations of the signals can not be derived directly, but the relatively accurate channel information at the time-frequency locations can be derived by using the channel information of the original pilots. The channel information can be used together with the channel information of the original pilots to estimate channel information of the rest of time-frequency locations for data transmission specified in the system.

Operation 102: The channel estimation device performs channel estimation on all the resources using the channel estimation values of the encrypted pilots through one-dimension channel estimation to derive channel estimation values over all the resources. All the resources are all the time-frequency resources, and the channel estimation values are channel impulse responses of all the time-frequency resources.

In the embodiment of the invention, the one-dimension channel estimation is performed in a less complex and precise algorithm, and the one-dimension channel estimation includes but will not be limited to channel estimation using one-dimension cascaded filtering interpolation, channel estimation using one-dimension cascaded linear interpolation, and channel estimation using one-dimension cascaded hybrid linear and filtering interpolation.

The one-dimension cascaded filtering interpolation particularly includes but will not be limited to: one-dimension cascaded filtering interpolation of firstly performing interpolation in the frequency domain and then performing interpolation in the time domain, and one-dimension cascaded filter interpolation of firstly performing interpolation in the time domain and then performing interpolation in the frequency domain. One-dimension cascaded linear interpolation includes but will not be limited to: one-dimension cascaded linear interpolation of firstly performing linear interpolation in the frequency domain and then performing linear interpolation in the time domain, and one-dimension cascaded linear interpolation of performing firstly linear interpolation in the time domain and then performing linear interpolation in the frequency domain. One-dimension cascaded hybrid linear and filtering interpolation includes but will not be limited to: one-dimension cascaded hybrid linear and filtering interpolations of firstly performing linear interpolation in the frequency domain and then performing filtering interpolation in the time domain, of firstly performing filtering interpolation in the time domain and then performing linear interpolation in the frequency domain, of firstly performing filtering interpolation in the frequency domain and then performing linear interpolation in the time domain, and of firstly performing linear interpolation in the time domain and then performing filtering interpolation in the frequency domain.

In the embodiment of the invention, the channel estimation device performs channel estimation on the encrypted pilots using the channel estimation values of the original pilots through two-dimension channel estimation to derive the channel estimation values of the encrypted pilots in the following process without any limitation thereto:

The channel estimation device determines a set of physical resource locations $(k_{a_i}, l_{a_i})$ of the encrypted pilots, where k represents a resource index in frequency domain, l represents a resource index time domain, a represents a resource index of an encrypted pilot, $i=\{1, 2, \ldots, N\}$, and N represents the number of encrypted pilots;

The channel estimation device determines a set of physical resource locations $(k_{b_{i,j}}, l_{b_{i,j}})$ of the original pilots for estimating the set of physical resource locations $(k_{a_i}, l_{a_i})$ of the encrypted pilots, where k represents a resource index in frequency domain, l represents a resource index in time domain, a represents a resource index of an encrypted pilot, b represents a resource index of an original pilot for estimating the encrypted pilot, $i=\{1, 2, \ldots, N\}$, N represents the number of encrypted pilots, $j=\{1, 2, \ldots, M_i\}$, and $M_i$ represents the number of original pilots for estimating the encrypted pilots; and The channel estimation device performs channel estimation on each encrypted pilot using the channel estimation values of the original pilots through two-dimension channel estimation to derive the channel estimation value of each encrypted pilot as $$H'(k_{a_i}, l_{a_i}) = P_{ft} \cdot \begin{bmatrix} \hat{H}(k_{b_{i,1}}, l_{b_{i,1}}) \\ M \\ \hat{H}(k_{b_{i,M_i}}, l_{b_{i,M_i}}) \end{bmatrix};$$

Where $P_{ft}$ represents a two-dimension filtering matrix based upon two-dimension channel estimation, and $\hat{H}(k_{b_{i,j}}, l_{b_{i,j}})$ represents the channel estimation values of the set of physical resource locations $(k_{b_{i,j}}, l_{b_{i,j}})$ of the original pilots.

In the embodiment of the invention, the channel estimation device determines the set of physical resource locations of the encrypted pilots in one or any combination of the following approaches without any limitation thereto:

In a first approach, the channel estimation device determines a preset set of physical resource locations of the encrypted pilots as the set of physical resource locations of the encrypted pilots.

In a second approach, the channel estimation device determines the set of physical resource locations of the encrypted pilots according to Doppler shift and delay information of channels.

When the Doppler shift and delay information of the channels is such that the Doppler shift values of the channels are above a first shift threshold and the delays of the channels are below a first time threshold, the channel estimation device increases the number of physical resource locations of the encrypted pilots in the time domain dimension of the original pilots, where both the first shift threshold and the first time threshold can be selected empirically. At this time the Doppler shift and delay information of the above channels indicates that the current scenario is a scenario with a high speed and a low delay. That is, in the scenario with a high speed and a low delay, when determining the physical resource locations of the encrypted pilots, the channel estimation device preferentially increases the number of physical resource locations of the encrypted pilots in the time domain dimension of the original pilots.

When the Doppler shift and delay information of the channels is such that the Doppler shift values of the channels are below a second shift threshold and the delays of the channels are above a second time threshold, the channel estimation device increases the number of physical resource locations of the encrypted pilots in the frequency domain dimension of the original pilots. Where both the second shift threshold and the second time threshold can be selected empirically, and the second shift threshold is less than the first shift threshold and the second time threshold is more than the first time threshold. At this time the Doppler shift and delay information of the above channels indicates that the current scenario is a scenario with a low speed and a high delay. That is, in the scenario with a low speed and a high delay, when determining the physical resource locations of the encrypted pilots, the channel estimation device preferentially increases the number of physical resource locations of the encrypted pilots in the frequency domain dimension of the original pilots.

In a third approach, the channel estimation device determines the set of physical resource locations of the encrypted pilots according to pilot pattern information, and location information of resources needed to be estimated as follows without any limitation thereto:

The channel estimation device determines physical resource locations distributed evenly in a region of the resources needed to be estimated as the physical resource locations of the encrypted pilots, according to the pilot pattern information and the location information of the resources needed to be estimated. That is, the channel estimation device determines the physical resource locations of the encrypted pilots by distributing the added physical resource locations of the encrypted pilots as evenly as possible in the region of the resources needed to be estimated; or the channel estimation device determines, according to the pilot pattern information and the location information of the resources needed to be estimated, central locations of the physical resources of the original pilots for estimating the channel estimation values of the encrypted pilots and determines physical resource locations at the central locations of the original pilots as the physical resource locations of the encrypted pilots. That is, the channel estimation device determines the physical resource locations of the encrypted pilots by positioning as many added physical resource locations of the encrypted pilots as possible at the central locations of the original pilots.

In the embodiment of the invention, the channel estimation device determines the set of physical resource locations of the original pilots for estimating the set of physical resource locations of the encrypted pilots in one or any combination of the following approaches without any limitation thereto:

In a first approach, the channel estimation device determines a preset set of physical resource locations of the original pilots as the set of physical resource locations of the original pilots for estimating the encrypted pilots.

In a second approach, the channel estimation device determines a set of physical resource locations of all or a part of original pilots, the correlation between which and the channels of the encrypted pilots satisfying a preset relationship, as the set of physical resource locations of the original pilots for estimating the encrypted pilots. That is, the channel estimation device determines a set of physical resource locations of all or a part of original pilots highly correlated with the channels of the encrypted pilots as the set of physical resource locations of the original pilots for estimating the encrypted pilots, and the number of physical resource locations of the original pilots for estimating the encrypted pilots depends upon the acceptable complexity of the algorithm, and Doppler shift and delay information of the channels.

The channel estimation device can further take the Doppler shift and delay information of the channels into account, when determining the set of physical resource locations of all or a part of original pilots, the correlation between which and the channels of the encrypted pilots satisfying a preset relationship, as the set of physical resource locations of the original pilots for estimating the encrypted pilots. Particularly when Doppler shift and delay information of the channels is such that the Doppler shift values of the channels are above a third shift threshold, and the delays of the channels are below a third time threshold, the channel estimation devices increases the number of physical resource locations of the original pilots, for estimating the encrypted pilots, the correlation between which and the channels of the encrypted pilots satisfying the preset relationship, in the frequency domain dimension of the original pilots. When the Doppler shift and delay information of the channels is such that the Doppler shift values of the channels are below a fourth shift threshold, and the delays of the channels are above a fourth time threshold, the channel estimation devices increases the number of physical resource locations of the original pilots, for estimating the encrypted pilots, the correlation between which and the channels of the encrypted pilots satisfying the preset relationship, in the time domain dimension of the original pilots. Correlation with the channels of the encrypted pilots satisfying the preset relationship refers to high correlation with the channels of the encrypted pilots.

Both the third shift threshold and the third time threshold can be selected empirically. At this time the Doppler shift and delay information of the channels indicates that the current scenario is a scenario with a high speed and a low delay. In the scenario with a high speed and a low delay, when determining the physical resource locations of the original pilots, the channel estimation device selects a number as small as possible of physical resource locations of the original pilots in the time domain and a number as large as possible of physical resource locations of the original pilots in the frequency domain.

Both the fourth shift threshold and the fourth time threshold can be selected empirically, and the fourth shift threshold is less than the third shift threshold and the fourth time threshold is more than the third time threshold. At this time the Doppler shift and delay information of the channels indicates that the current scenario is a scenario with a low peed and a high delay. In the scenario with a low peed and a high delay, when determining the physical resource locations of the original pilots, the channel estimation device selects a number as large as possible of physical resource locations of the original pilots in the time domain and a number as small as possible of physical resource locations of the original pilots in the frequency domain.

In the embodiment of the invention, the set of physical resource locations $(k_{a_{ij}}, l_{a_{ij}})$ of the encrypted pilots may coincide completely or partially or may not coincide with the set of physical resource locations $(k_{b_{ij}}, l_{b_{ij}})$ of the original pilots. The channel estimation device performs channel estimation on all the resources using the channel estimation values of the encrypted pilots through one-dimension channel estimation to derive the channel estimation values over all the resources as follows without any limitation thereto:

When the set of physical resource locations $(k_{a_{ij}}, l_{a_{ij}})$ of the encrypted pilots coincide completely or partially with the set of physical resource locations $(k_{b_{ij}}, l_{b_{ij}})$ of the original pilots, the channel estimation device performs channel estimation on all the resources using the channel estimation values $H'(k_{a_{ij}}, l_{a_{ij}})$ of the encrypted pilots through one-dimension channel estimation to derive the channel estimation values over all the resources (k,l); or When the set of physical resource locations $(k_{a_{ij}}, l_{a_{ij}})$ of the encrypted pilots do not coincide with the set of physical resource locations $(k_{b_{ij}}, l_{b_{ij}})$ of the original pilots, the channel estimation device performs channel estimation on all the resources using the channel estimation values $H'(k_{a_{ij}}, l_{a_{ij}})$ of the encrypted pilots and the channel estimation values $H(k_{b_{ij}}, l_{b_{ij}})$ of the original pilots through one-dimension channel estimation to derive the channel estimation values over all the resources (k,l).

In summary, the embodiment of the invention can make full use of pilots having high correlation around interpolation points for interpolation calculation to thereby improve the precision of channel estimation. Moreover the embodiment of the invention can lower the complexity of algorithm.

Figure 2:
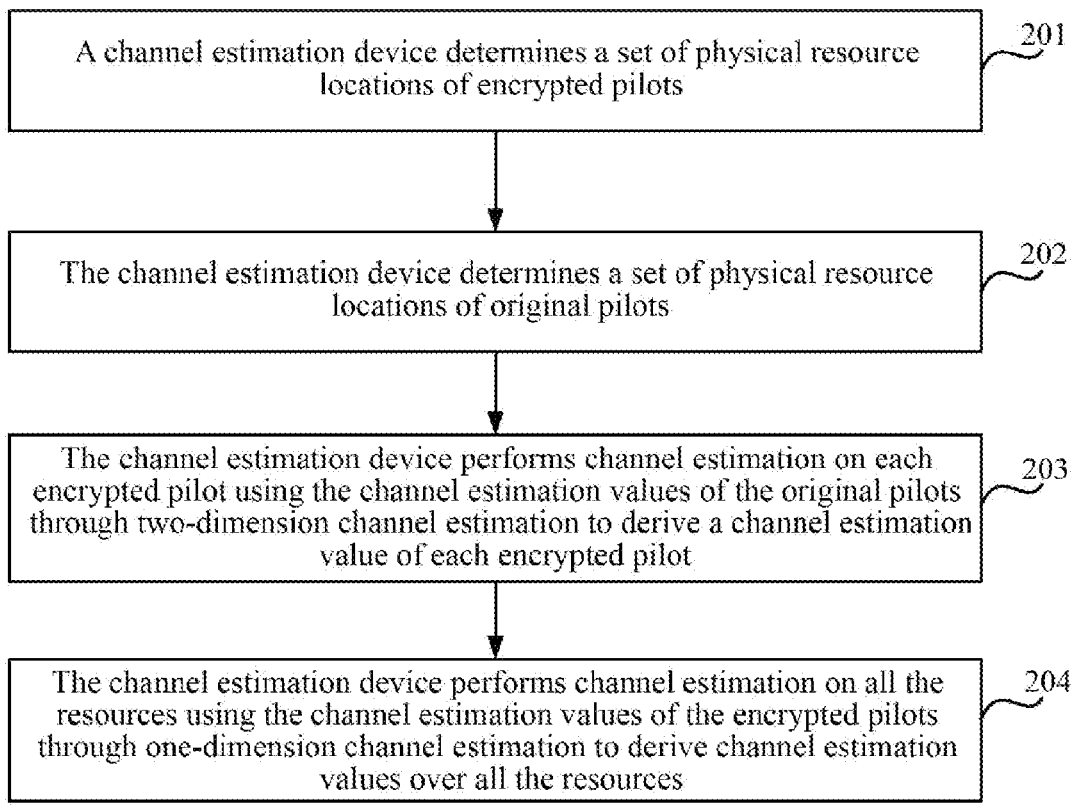
FIG. 2 illustrates a schematic flow chart of a channel estimation method according to another embodiment of the invention.

Another embodiment of the invention provides a channel estimation method which can be applicable to uplink and downlink channel estimation processes and to LTE, LTE-A, CMMB and other systems. In the channel estimation process in the application scenario above, the method is used for estimating channel impulse responses (i.e., channel estimation values) of time-frequency resources, where received data are located, according to channel impulse responses (i.e., channel estimation values) of time-frequency resources where transmitted pilots are located. Taking two-dimension channel estimation being filtering interpolation in both time and frequency dimensions and one-dimension channel estimation being one-dimension cascaded filtering interpolation of firstly performing interpolation in the frequency domain and then performing interpolation in the time domain as an example, as illustrated in FIG. 2, the channel estimation method includes the following operations:

Operation 201: A channel estimation device determines a set of physical resource locations $(k_{a_{ij}}, l_{a_{ij}})$ of encrypted pilots, where k represents a resource index in frequency domain, l represents a resource index in time domain, a represents a resource index of an encrypted pilot, i={1, 2, ..., N}, and N represents the number of encrypted pilots;

In the embodiment of the invention, the channel estimation device determines the set of physical resource locations of the encrypted pilots in one or any combination of the following approaches without any limitation thereto:

In a first approach, the channel estimation device determines a preset set of physical resource locations of the encrypted pilots as the set of physical resource locations of the encrypted pilots.

In a second approach, the channel estimation device determines the set of physical resource locations of the encrypted pilots according to Doppler shift and delay information of channels.

When the Doppler shift and delay information of the channels is such that the Doppler shift values of the channels are above the first shift threshold and the delays of the channels are below the first time threshold, the channel estimation device increases the number of physical resource locations of the encrypted pilots in the time domain dimension of the original pilots, where both the first shift threshold and the first time threshold can be selected empirically. At this time the Doppler shift and delay information of the channels indicates that the current scenario is a scenario with a high speed and a low delay. That is, in the scenario with a high speed and a low delay, when determining the physical resource locations of the encrypted pilots, the channel estimation device preferentially increases the number of physical resource locations of the encrypted pilots in the time domain dimension of the original pilots.

When the Doppler shift and delay information of the channels is such that the Doppler shift values of the channels are below a second shift threshold and the delays of the channels are above a second time threshold, the channel estimation device increases the number of physical resource locations of the encrypted pilots in the frequency domain dimension of the original pilots. Where both the second shift threshold and the second time threshold can be selected empirically, and the second shift threshold is less than the first shift threshold and the second time threshold is more than the first time threshold. At this time the Doppler shift and delay information of the channels indicates that the current scenario is a scenario with a low speed and a high delay. That is, in the scenario with a low speed and a high delay, when determining the physical resource locations of the encrypted pilots, the channel estimation device preferentially increases the number of physical resource locations of the encrypted pilots in the frequency domain dimension of the original pilots.

In a third approach, the channel estimation device determines the set of physical resource locations of the encrypted pilots according to pilot pattern information, and location information of resources needed to be estimated as follows without any limitation thereto:

The channel estimation device determines physical resource locations distributed evenly in a region of the resources needed to be estimated as the physical resource locations of the encrypted pilots, according to the pilot pattern information and the location information of the resources needed to be estimated. That is, the channel estimation device determines the physical resource locations of the encrypted pilots by distributing the added physical resource locations of the encrypted pilots as evenly as possible in the region of the resources needed to be estimated; or the channel estimation device determines, according to the pilot pattern information and the location information of the resources needed to be estimated, central locations of the physical resources of the original pilots for estimating the channel estimation values of the encrypted pilots and determines physical resource locations at the central locations of the original pilots as the physical resource locations of the encrypted pilots. That is, the channel estimation device determines the physical resource locations of the encrypted pilots by positioning as many added physical resource locations of the encrypted pilots as possible at the central locations of the original pilots.

Operation 202: The channel estimation device determines a set of physical resource locations $(k_{b_{i,j}}, l_{b_{i,j}})$ of original pilots. Where the determined set of physical resource locations $(k_{b_{i,j}}, l_{b_{i,j}})$ of original pilots is used for estimating the set of physical resource locations $(k_{a_i}, l_{a_i})$ of the encrypted pilots, where k represents a resource index in frequency domain, l represents a resource index in time domain, a represents a resource index of an encrypted pilot, b represents a resource index of an original pilot for estimating the encrypted pilot, i={1, 2, ..., N}, N represents the number of encrypted pilots, j={1, 2, ..., $M_i$}, and $M_i$ represents the number of original pilots for estimating the encrypted pilots.

In the embodiment of the invention, the channel estimation device determines the set of physical resource locations of the original pilots for estimating the set of physical resource locations of the encrypted pilots in one or any combination of the following approaches without any limitation thereto:

In a first approach, the channel estimation device determines a preset set of physical resource locations of the original pilots as the set of physical resource locations of the original pilots for estimating the encrypted pilots.

In a second approach, the channel estimation device determines a set of physical resource locations of all or a part of original pilots, the correlation between which and the channels of the encrypted pilots satisfying a preset relationship, as the set of physical resource locations of the original pilots for estimating the encrypted pilots. That is, the channel estimation device determines a set of physical resource locations of all or a part of original pilots highly correlated with the channels of the encrypted pilots as the set of physical resource locations of the original pilots for estimating the encrypted pilots, and the number of physical resource locations of the original pilots for estimating the encrypted pilots depends upon the acceptable complexity of the algorithm, and Doppler shift and delay information of the channels.

The channel estimation device can further take the Doppler shift and delay information of the channels into account, when determining the set of physical resource locations of all or a part of original pilots, the correlation between which and the channels of the encrypted pilots satisfying a preset relationship, as the set of physical resource locations of the original pilots for estimating the encrypted pilots. Particularly when Doppler shift and delay information of the channels is such that the Doppler shift values of the channels are above a third shift threshold, and the delays of the channels are below a third time threshold, the channel estimation devices increases the number of physical resource locations of the original pilots, for estimating the encrypted pilots, the correlation between which and the channels of the encrypted pilots satisfying the preset relationship, in the frequency domain dimension of the original pilots. When the Doppler shift and delay information of the channels is such that the Doppler shift values of the channels are below a fourth shift threshold, and the delays of the channels are above a fourth time threshold, the channel estimation devices increases the number of physical resource locations of the original pilots, for estimating the encrypted pilots, the correlation between which and the channels of the encrypted pilots satisfying the preset relationship, in the time domain dimension of the original pilots. Correlation with the channels of the encrypted pilots satisfying the preset relationship refers to high correlation with the channels of the encrypted pilots.

Both the third shift threshold and the third time threshold can be selected empirically. At this time the Doppler shift and delay information of the channels indicates that the current scenario is a scenario with a high speed and a low delay. In the scenario with a high speed and a low delay, when determining the physical resource locations of the original pilots, the channel estimation device selects a number as small as possible of physical resource locations of the original pilots in the time domain and a number as large as possible of physical resource locations of the original pilots in the frequency domain.

Both the fourth shift threshold and the fourth time threshold can be selected empirically, and the fourth shift threshold is less than the third shift threshold and the fourth time threshold is more than the third time threshold. At this time the Doppler shift and delay information of the channels indicates that the current scenario is a scenario with a low peed and a high delay. In the scenario with a low peed and a high delay, when determining the physical resource locations of the original pilots, the channel estimation device selects a number as large as possible of physical resource locations of the original pilots in the time domain and a number as small as possible of physical resource locations of the original pilots in the frequency domain.

Figure 3:
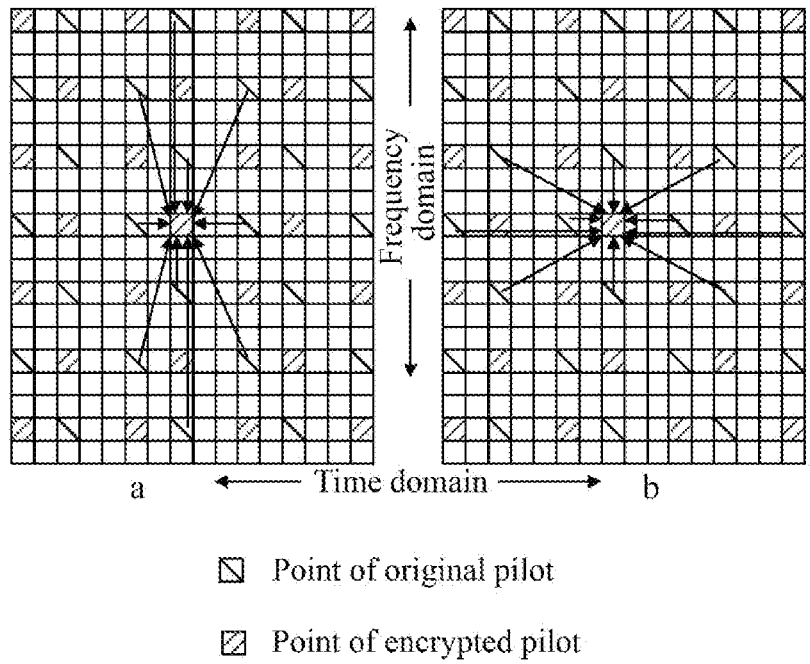
FIG. 3 illustrates a schematic diagram of determining physical resource locations of original pilots having high correlation as a set of physical resource locations of the original pilots according to an embodiment of the invention.

FIG. 3 illustrates a schematic diagram of determining physical resource locations of original pilots having high correlation as a set of physical resource locations of the original pilots according to an embodiment of the invention. In FIG. 3, diagram a represents an example of a scenario with a high speed and a low delay. In the scenario with a high speed and a low delay, a number as small as possible of physical resource locations of original pilots are selected in the time domain, and a number as large as possible of physical resource locations of original pilots are selected in the frequency domain. In FIG. 3, diagram b represents an example of a scenario with a low speed and a high delay. In the scenario with a low speed and a high delay, a number as large as possible of physical resource locations of original pilots are selected in the time domain, and a number as small as possible of physical resource locations of original pilots are selected in the frequency domain.

Operation 203: The channel estimation device performs channel estimation on each encrypted pilot using the channel estimation values of the original pilots through two-dimension channel estimation to derive the channel estimation value of each encrypted pilot as $$H'(k_{a_i}, l_{a_i}) = P_{ft} \cdot \begin{bmatrix} \hat{H}(k_{b_{i,1}}, l_{b_{i,1}}) \\ M \\ \hat{H}(k_{b_{i,M_i}}, l_{b_{i,M_i}}) \end{bmatrix},$$

Where $P_{ft}$ represents a two-dimension filtering matrix based upon two-dimension channel estimation, and $\hat{H}(k_{b_{i,j}}, l_{b_{i,j}})$ represents the channel estimation values of the set of physical resource locations $(k_{b_{i,j}}, l_{b_{i,j}})$ of the original pilots.

In the embodiment of the invention, in the process that the channel estimation device can perform channel estimation on each encrypted pilot using the channel estimation values of the original pilots to derive the channel estimation value of the encrypted pilot, the channel estimation device can further divide a region, in which the encrypted pilots are to be estimated, into a plurality of zones and estimate the channel estimation values of the encrypted pilots in the respective zones respectively to thereby lower the complexity of calculation.

Operation 204: The channel estimation device performs channel estimation on all the resources using the channel estimation values of the encrypted pilots through one-dimension channel estimation to derive channel estimation values over all the resources. All the resources are all the channel resources, and the channel estimation values are channel impulse responses of all the time-frequency resources. In the embodiment of the invention, one-dimension channel estimation can be one-dimension cascaded filtering interpolation of firstly performing interpolation in the frequency domain and then performing interpolation in the time domain.

Figure 4:
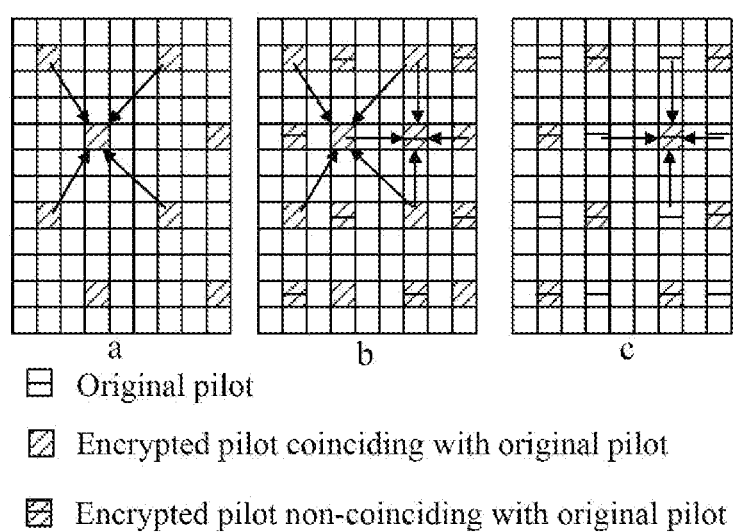
FIG. 4 illustrates a schematic diagram of a set of physical resource locations of encrypted pilots and a set of physical resource locations of original pilots according to an embodiment of the invention.

FIG. 4 illustrates a schematic diagram of a set of physical resource locations $(k_{a_i}, l_{a_i})$ of encrypted pilots and a set of physical resource locations $(k_{b_{i,j}}, l_{b_{i,j}})$ of original pilots according to an embodiment of the invention. The set of physical resource locations $(k_{a_i}, l_{a_i})$ of the encrypted pilots may coincide completely with the set of physical resource locations $(k_{b_{i,j}}, l_{b_{i,j}})$ of the original pilots as illustrated in diagram a in FIG. 4. Alternatively the set of physical resource locations $(k_{a_i}, l_{a_i})$ of the encrypted pilots may coincide partially with the set of physical resource locations $(k_{b_{i,j}}, l_{b_{i,j}})$ of the original pilots as illustrated in diagram b in FIG. 4. Alternatively the set of physical resource locations $(k_{a_i}, l_{a_i})$ of the encrypted pilots may not coincide with the set of physical resource locations $(k_{b_{i,j}}, l_{b_{i,j}})$ of the original pilots as illustrated in diagram c in FIG. 4.

When the set of physical resource locations $(k_{a_i}, l_{a_i})$ of the encrypted pilots coincide completely or partially with the set of physical resource locations $(k_{b_{i,j}}, l_{b_{i,j}})$ of the original pilots, the channel estimation device performs channel estimation on all the resources using the channel estimation values $H'(k_{a_i}, l_{a_i})$ of the encrypted pilots through one-dimension cascaded filtering interpolation of firstly performing interpolation in the frequency domain and then performing interpolation in the time domain to derive the channel estimation values over all the resources (k,l); or When the set of physical resource locations $(k_{a_i}, l_{a_i})$ of the encrypted pilots do not coincide with the set of physical resource locations $(k_{b_{i,j}}, l_{b_{i,j}})$ of the original pilots, the channel estimation device performs channel estimation on all the resources using the channel estimation values $H'(k_{a_i}, l_{a_i})$ of the encrypted pilots and the channel estimation values $\hat{H}(k_{b_{i,j}}, l_{b_{i,j}})$ of the original pilots through one-dimension cascaded filtering interpolation of firstly performing interpolation in the frequency domain and then performing interpolation in the time domain to derive the channel estimation values over all the resources (k,l).

In the embodiment of the invention, in the process that the channel estimation device performs channel estimation on all the resources using the channel estimation values of the encrypted pilots through one-dimension channel estimation to derive the channel estimation values over all the resources, the channel estimation device can further divide a region, in which the resources are to be estimated, into a plurality of zones and estimate the channel estimation values of the data points in the respective zones respectively to thereby lower the complexity of calculation.

In summary, the embodiment of the invention can make full use of pilots having high correlation around interpolation points for interpolation calculation to thereby improve the precision of channel estimation. Moreover the embodiment of the invention can lower the complexity of algorithm.

Figure 5:
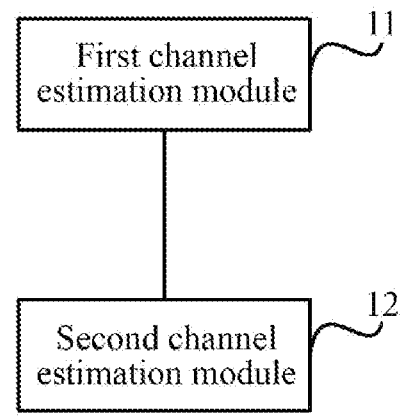
FIG. 5 illustrates a schematic structural diagram of a channel estimation device according to an embodiment of the invention.

An embodiment of the invention further provides a channel estimation device. As illustrated in FIG. 5, the channel estimation device includes:

A first channel estimation module 11 is configured to perform channel estimation on encrypted pilots using channel estimation values of original pilots through two-dimension channel estimation to derive channel estimation values of the encrypted pilots; and A second channel estimation module 12 is configured to perform channel estimation on all the resources using the channel estimation values of the encrypted pilots through one-dimension channel estimation to derive channel estimation values over all the resources.

In an embodiment of the invention, the first channel estimation module 11 is configured to determine a set of physical resource locations $(k_{a_i}, l_{a_i})$ of the encrypted pilots, where k represents a resource index in frequency domain, l represents a resource index in time domain, a represents a resource index of an encrypted pilot, $i=\{1, 2, \ldots, N\}$, and N represents the number of encrypted pilots;

To determine a set of physical resource locations $(k_{b_{i,j}}, l_{b_{i,j}})$ of the original pilots for estimating the set of physical resource locations $(k_{a_i}, l_{a_i})$ of the encrypted pilots, where k represents a resource index in frequency domain, l represents a resource index in time domain, a represents a resource index of an encrypted pilot, b represents a resource index of an original pilot for estimating the encrypted pilot, $i=\{1, 2, \ldots, N\}$, N represents the number of encrypted pilots, $j=\{1, 2, \ldots, M_1\}$, and $M_i$ represents the number of original pilots for estimating the encrypted pilots; and To perform channel estimation on each encrypted pilot using the channel estimation values of the original pilots through two-dimension channel estimation to derive the channel estimation value of each encrypted pilot as $$H'(k_{a_i}, l_{a_i}) = P_{ft} \cdot \begin{bmatrix} \hat{H}(k_{b_{i,1}}, l_{b_{i,1}}) \\ M \\ \hat{H}(k_{b_{i,M_i}}, l_{b_{i,M_i}}) \end{bmatrix};$$

Where $P_{ft}$ represents a two-dimension filtering matrix based upon two-dimension channel estimation, and $\hat{H}(k_{b_{i,j}}, l_{b_{i,j}})$ represents the channel estimation values of the set of physical resource locations $(k_{b_{i,j}}, l_{b_{i,j}})$ of the original pilots.

In an embodiment of the invention, the first channel estimation module 11 configured to determine the set of physical resource locations of the encrypted pilots is configured in one or any combination of the following approaches:

To determine a preset set of physical resource locations of the encrypted pilots as the set of physical resource locations of the encrypted pilots;

To determine the set of physical resource locations of the encrypted pilots, according to Doppler shift and delay information of channels;

To determine the set of physical resource locations of the encrypted pilots, according to pilot pattern information and location information of resources needed to be estimated.

In an embodiment of the invention, the first channel estimation module 11 is configured, when the Doppler shift and delay information of the channels is such that the Doppler shift values of the channels are above a first shift threshold and the delays of the channels are below a first time threshold, to increase the number of physical resource locations of the encrypted pilots in the time domain dimension of the original pilots; or when the Doppler shift and delay information of the channels is such that the Doppler shift values of the channels are below a second shift threshold and the delays of the channels are above a second time threshold, to increase the number of physical resource locations of the encrypted pilots in the frequency domain dimension of the original pilots; and To determine, according to the pilot pattern information and the location information of the resources needed to be estimated, physical resource locations distributed evenly in a region of the resources needed to be estimated as the physical resource locations of the encrypted pilots; or to determine, according to the pilot pattern information and the location information of the resources needed to be estimated, central locations of the physical resources of the original pilots for estimating the channel estimation values of the encrypted pilots, and to determine physical resource locations at the central locations of the original pilots as the physical resource locations of the encrypted pilots.

In an embodiment of the invention, the first channel estimation module 11 configured to determine the set of physical resource locations of the original pilots for estimating the encrypted pilots is configured:

To determine a set of physical resource locations of all or a part of original pilots, the correlation between which and the channels of the encrypted pilots satisfying a preset relationship, as the set of physical resource locations of the original pilots for estimating the encrypted pilots; and/or To determine a preset set of physical resource locations of the original pilots as the set of physical resource locations of the original pilots for estimating the encrypted pilots.

In an embodiment of the invention, the first channel estimation module 11 is configured, when Doppler shift and delay information of the channels is such that the Doppler shift values of the channels are above a third shift threshold, and the delays of the channels are below a third time threshold, to increase the number of physical resource locations of the original pilots, for estimating the encrypted pilots, the correlation between which and the channels of the encrypted pilots satisfying the preset relationship, in the frequency domain dimension of the original pilots; or When the Doppler shift and delay information of the channels is such that the Doppler shift values of the channels are below a fourth shift threshold, and the delays of the channels are above a fourth time threshold, to increase the number of physical resource locations of the original pilots, for estimating the encrypted pilots, the correlation between which and the channels of the encrypted pilots satisfying the preset relationship, in the time domain dimension of the original pilots.

In an embodiment of the invention, the second channel estimation module 12 is configured, when the set of physical resource locations $(k_{a_i}, l_{a_i})$ of the encrypted pilots coincide completely or partially with the set of physical resource locations $(k_{b_{ij}}, l_{b_{ij}})$ of the original pilots, to perform channel estimation on all the resources using the channel estimation values $H'(k_{a_i}, l_{a_i})$ of the encrypted pilots through one-dimension channel estimation to derive the channel estimation values over all the resources; or When the set of physical resource locations $(k_{a_i}, l_{a_i})$ of the encrypted pilots do not coincide with the set of physical resource locations $(k_{b_{ij}}, l_{b_{ij}})$ of the original pilots, to perform channel estimation on all the resources using the channel estimation values $H'(k_{a_i}, l_{a_i})$ of the encrypted pilots and the channel estimation values $\hat{H}(k_{b_{ij}}, l_{b_{ij}})$ of the original pilots through one-dimension channel estimation to derive the channel estimation values over all the resources.

In this embodiment of the invention, the two-dimension channel estimation includes channel estimation using two-dimension filtering interpolation in the time and frequency domains; and The one-dimension channel estimation includes channel estimation using one-dimension cascaded filtering interpolation, channel estimation using one-dimension cascaded linear interpolation, and channel estimation using one-dimension cascaded hybrid linear and filtering interpolation, The one-dimension cascaded filtering interpolation includes one-dimension cascaded filtering interpolation of firstly performing interpolation in the frequency domain and then performing interpolation in the time domain, and one-dimension cascaded filtering interpolation of firstly performing interpolation in the time domain and then performing interpolation in the frequency domain, The one-dimension cascaded linear interpolation includes one-dimension cascaded linear interpolation of firstly performing linear interpolation in the frequency domain and then performing linear interpolation in the time domain, and one-dimension cascaded linear interpolation of firstly performing linear interpolation in the time domain and then performing linear interpolation in the frequency domain, and The one-dimension cascaded hybrid linear and filtering interpolation includes one-dimension cascaded hybrid linear and filtering interpolations of firstly performing linear interpolation in the frequency domain and then performing filtering interpolation in the time domain, of firstly performing filtering interpolation in the time domain and then performing linear interpolation in the frequency domain, of firstly performing filtering interpolation in the frequency domain and then performing linear interpolation in the time domain, and of firstly performing linear interpolation in the time domain and then performing filtering interpolation in the frequency domain.

Figure 6:
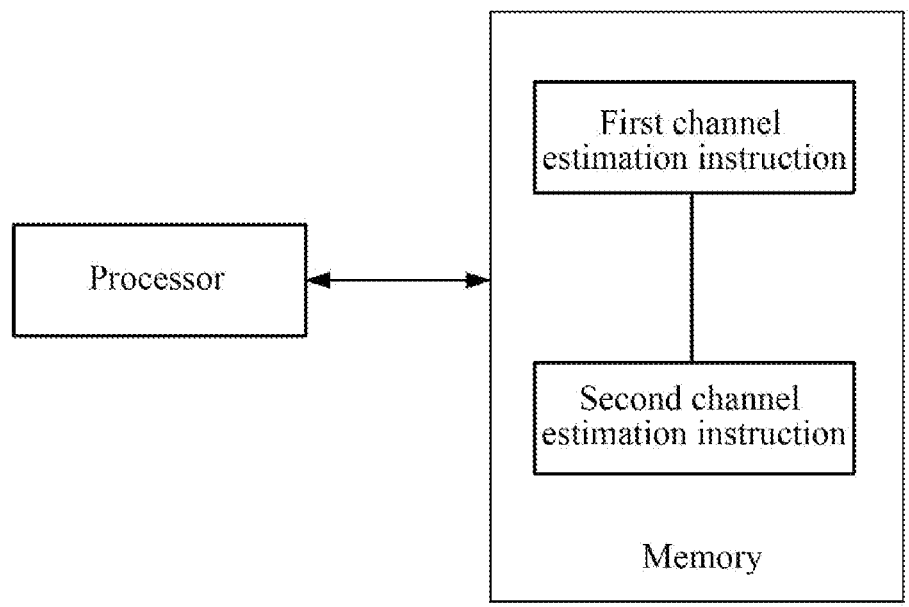
FIG. 6 illustrates a schematic structural diagram of a channel estimation device according to another embodiment of the invention.

FIG. 6 illustrates a schematic structural diagram of a channel estimation device according to another embodiment of the invention. As illustrated in FIG. 6, the device includes a memory and a processor communicating with the memory, where the memory includes a first channel estimation instruction, and a second channel estimation instruction, executable by the processor. The memory can be a nonvolatile computer readable storage medium, and the first channel estimation instruction and the second channel estimation instruction can be machine readable instructions stored in the memory. The processor can also execute the machine readable instructions stored in the memory.

In this embodiment, the first channel estimation instruction is configured to perform channel estimation on encrypted pilots using channel estimation values of original pilots through two-dimension channel estimation to derive channel estimation values of the encrypted pilots; and The second channel estimation instruction is configured to perform channel estimation on all the resources using the channel estimation values of the encrypted pilots through one-dimension channel estimation to derive channel estimation values over all the resources.

In this embodiment of the invention, the first channel estimation instruction is configured to determine a set of physical resource locations $(k_{a_i}, l_{a_i})$ of the encrypted pilots, where k represents a resource index in frequency domain, l represents a resource index in time domain, a represents a resource index of an encrypted pilot, i={1, 2, . . . , N}, and N represents the number of encrypted pilots;

To determine a set of physical resource locations $(k_{b_{ij}}, l_{b_{ij}})$ of the original pilots for estimating the set of physical resource locations $(k_{a_i}, l_{a_i})$ of the encrypted pilots, where k represents a resource index in frequency domain, l represents a resource index in time domain, a represents a resource index of an encrypted pilot, b represents a resource index of an original pilot for estimating the encrypted pilot, i={1, 2, . . . , N}, N represents the number of encrypted pilots, j={1, 2, . . . , $M_i$}, and $M_i$ represents the number of original pilots for estimating the encrypted pilots; and To perform channel estimation on each encrypted pilot using the channel estimation values of the original pilots through two-dimension channel estimation to derive the channel estimation value of each encrypted pilot as $$H'(k_{a_j}, l_{a_j}) = P_{ft} \cdot \begin{bmatrix} \hat{H}(k_{b_{i,1}}, l_{b_{i,1}}) \\ M \\ \hat{H}(k_{b_{i,M_i}}, l_{b_{i,M_i}}) \end{bmatrix},$$

Where $P_{ft}$ represents a two-dimension filtering matrix based upon two-dimension channel estimation, and $\hat{H}(k_{b_{i,j}}, l_{b_{i,j}})$ represents the channel estimation values of the set of physical resource locations $(k_{b_{i,j}}, l_{b_{i,j}})$ of the original pilots.

In this embodiment of the invention, the first channel estimation instruction configured to determine the set of physical resource locations of the encrypted pilots is configured in one or any combination of the following approaches:

To determine a preset set of physical resource locations of the encrypted pilots as the set of physical resource locations of the encrypted pilots; and/or To determine the set of physical resource locations of the encrypted pilots, according to Doppler shift and delay information of channels; and/or To determine the set of physical resource locations of the encrypted pilots, according to pilot pattern information and location information of resources needed to be estimated.

In this embodiment of the invention, the first channel estimation instruction is configured, when the Doppler shift and delay information of the channels is such that the Doppler shift values of the channels are above a first shift threshold and the delays of the channels are below a first time threshold, to increase the number of physical resource locations of the encrypted pilots in the time domain dimension of the original pilots; or when the Doppler shift and delay information of the channels is such that the Doppler shift values of the channels are below a second shift threshold and the delays of the channels are above a second time threshold, to increase the number of physical resource locations of the encrypted pilots in the frequency domain dimension of the original pilots; and To determine, according to the pilot pattern information and the location information of the resources needed to be estimated, physical resource locations distributed evenly in a region of the resources needed to be estimated as the physical resource locations of the encrypted pilots; or to determine, according to the pilot pattern information and the location information of the resources needed to be estimated, central locations of the physical resources of the original pilots for estimating the channel estimation values of the encrypted pilots, and to determine physical resource locations at the central locations of the original pilots as the physical resource locations of the encrypted pilots.

In this embodiment of the invention, the first channel estimation instruction configured to determine the set of physical resource locations of the original pilots for estimating the encrypted pilots is configured:

To determine a set of physical resource locations of all or a part of original pilots, the correlation between which and the channels of the encrypted pilots satisfying a preset relationship, as the set of physical resource locations of the original pilots for estimating the encrypted pilots; and/or To determine a preset set of physical resource locations of the original pilots as the set of physical resource locations of the original pilots for estimating the encrypted pilots.

In this embodiment of the invention, the first channel estimation instruction is configured, when Doppler shift and delay information of the channels is such that the Doppler shift values of the channels are above a third shift threshold, and the delays of the channels are below a third time threshold, to increase the number of physical resource locations of the original pilots, for estimating the encrypted pilots, the correlation between which and the channels of the encrypted pilots satisfying the preset relationship, in the frequency domain dimension of the original pilots; or When the Doppler shift and delay information of the channels is such that the Doppler shifts of the channels are below a fourth shift threshold, and the delays of the channels are above a fourth time threshold, to increase the number of physical resource locations of the original pilots, for estimating the encrypted pilots, the correlation between which and the channels of the encrypted pilots satisfying the preset relationship, in the time domain dimension of the original pilots.

In this embodiment of the invention, the second channel estimation instruction is configured, when the set of physical resource locations $(k_{a_j}, l_{a_j})$ of the encrypted pilots coincide completely or partially with the set of physical resource locations $(k_{b_{i,j}}, l_{b_{i,j}})$ of the original pilots, to perform channel estimation on all the resources using the channel estimation values $H'(k_{a_j}, l_{a_j})$ of the encrypted pilots through one-dimension channel estimation to derive the channel estimation values over all the resources; or When the set of physical resource locations $(k_{a_j}, l_{a_j})$ of the encrypted pilots do not coincide with the set of physical resource locations $(k_{b_{i,j}}, l_{b_{i,j}})$ of the original pilots, to perform channel estimation on all the resources using the channel estimation values $H'(k_{a_j}, l_{a_j})$ of the encrypted pilots and the channel estimation values $\hat{H}(k_{b_{i,j}}, l_{b_{i,j}})$ of the original pilots through one-dimension channel estimation to derive the channel estimation values over all the resources.

In this embodiment of the invention, the two-dimension channel estimation includes channel estimation using two-dimension filtering interpolation in the time and frequency domains; and The one-dimension channel estimation includes channel estimation using one-dimension cascaded filtering interpolation, channel estimation using one-dimension cascaded linear interpolation, and channel estimation using one-dimension cascaded hybrid linear and filtering interpolation, The one-dimension cascaded filtering interpolation includes one-dimension cascaded filtering interpolation of firstly performing interpolation in the frequency domain and then performing interpolation in the time domain, and one-dimension cascaded filtering interpolation of firstly performing interpolation in the time domain and then performing interpolation in the frequency domain, The one-dimension cascaded linear interpolation includes one-dimension cascaded linear interpolation of firstly performing linear interpolation in the frequency domain and then performing linear interpolation in the time domain, and one-dimension cascaded linear interpolation of firstly performing linear interpolation in the time domain and then performing linear interpolation in the frequency domain, and The one-dimension cascaded hybrid linear and filtering interpolation includes one-dimension cascaded hybrid linear and filtering interpolations of firstly performing linear interpolation in the frequency domain and then performing filtering interpolation in the time domain, of firstly performing filtering interpolation in the time domain and then performing linear interpolation in the frequency domain, of firstly performing filtering interpolation in the frequency domain and then performing linear interpolation in the time domain, and of firstly performing linear interpolation in the time domain and then performing filtering interpolation in the frequency domain.

In summary, the embodiment of the invention can make full use of pilots having high correlation around interpolation points for interpolation calculation to thereby improve the precision of channel estimation. Moreover the embodiment of the invention can lower the complexity of algorithm.

The respective modules in the device according to the embodiments of the invention can be integrated together or can be deployed separately. The modules above can be combined into a single module or can be further divided into a plurality of sub-modules.

Those ordinarily skilled in the art can clearly appreciate from the foregoing description of the embodiments that the invention can be implemented in software plus a necessary general hardware platform or, of course, in hardware, although the former implementation may be preferred in many cases. Based upon such understanding, the technical solutions of the invention in essence or the part thereof contributing to the prior art can be embodied in the form of a software product, which can be stored in a storage medium, and which includes several instructions to cause a computer device (e.g., a personal computer, a server, a network device, etc.) to perform the methods according to the respective embodiments of the invention.

Those skilled in the art can appreciate that the drawings are schematic diagrams of some preferred embodiments, and the modules or the flows in the drawings may not be necessary to an implementation of the embodiments of the invention.

Those skilled in the art can appreciate that the modules in the devices of the embodiments can be distributed in the devices of the embodiments as described in the embodiments or located in one or more devices different from those of the embodiments given corresponding variations. The modules of the embodiments can be combined into one module or further subdivided into a plurality of sub-modules.

The embodiments of the invention have been numbered only for the sake of a convenient description but will not represent any superiority of one embodiment to another.

The foregoing disclosure is merely illustrative of several embodiments of the invention, but the invention will not be limited thereto, and any variations that can occur to those skilled in the art shall come into the claimed scope of the embodiments of the invention.

The invention claimed is:

1. A channel estimation method, comprising:
performing, by a channel estimation device, channel estimation on encrypted pilots using channel estimation values of original pilots by adopting two-dimension channel estimation approach to derive channel estimation values of the encrypted pilots; and
performing, by the channel estimation device, channel estimation on all resources using the channel estimation values of the encrypted pilots by adopting one-dimension channel estimation approach to derive channel estimation values over all the resources.

2. The method according to claim 1, wherein performing, by the channel estimation device, channel estimation on the encrypted pilots using the channel estimation values of the original pilots by adopting the two-dimension channel estimation approach to derive the channel estimation values of the encrypted pilots comprises:
determining, by the channel estimation device, a set of physical resource locations $(k_{a_i}, l_{a_i})$ of the encrypted pilots, wherein k represents a frequency resource index in frequency domain, l represents a time resource index in time domain, a represents a resource index of an encrypted pilot, i={1, 2, ..., N}, and N represents the number of encrypted pilots;
determining, by the channel estimation device, a set of physical resource locations $(k_{b_{i,j}}, l_{b_{i,j}})$ of the original pilots for estimating the set of physical resource locations $(k_{a_i}, l_{a_i})$ of the encrypted pilots, wherein k represents a frequency resource index in frequency domain, l represents a time resource index, a represents a resource index of an encrypted pilot, b represents a resource index of an original pilot for estimating the encrypted pilot, i={1, 2, ..., N}, N represents the number of encrypted pilots, j={1, 2, ..., $M_i$}, and $M_i$ represents the number of original pilots for estimating the encrypted pilots; and
performing, by the channel estimation device, channel estimation on each encrypted pilot using the channel estimation values of the original pilots by adopting the two-dimension channel estimation approach to derive the channel estimation value of each encrypted pilot as $$H'(k_{a_i}, l_{a_i}) = P_{ft} \cdot \begin{bmatrix} \hat{H}(k_{b_{i,1}}, l_{b_{i,1}}) \\ M \\ \hat{H}(k_{b_{i,M_i}}, l_{b_{i,M_i}}) \end{bmatrix},$$

wherein $P_{ft}$ represents a two-dimension filtering matrix based upon the two-dimension channel estimation, and $\hat{H}(k_{b_{i,j}}, l_{b_{i,j}})$ represents the channel estimation values of the set of physical resource locations $(k_{b_{i,j}}, l_{b_{i,j}})$ of the original pilots.

3. The method according to claim 2, wherein determining, by the channel estimation device, the set of physical resource locations of the encrypted pilots comprises one or any combination of:
determining, by the channel estimation device, a preset set of physical resource locations of the encrypted pilots as the set of physical resource locations of the encrypted pilots;
determining, by the channel estimation device, the set of physical resource locations of the encrypted pilots, according to Doppler shift and delay information of channels;
determining, by the channel estimation device, the set of physical resource locations of the encrypted pilots, according to pilot pattern information, and location information of resources needed to be estimated.

4. The method according to claim 3, wherein:
determining, by the channel estimation device, the set of physical resource locations of the encrypted pilots according to the Doppler shift and delay information of channels comprises: when the Doppler shift and delay information of the channels is such that the Doppler shift values of the channels are above a first shift threshold and the delays of the channels are below a first time threshold, increasing, by the channel estimation device, the number of physical resource locations of the encrypted pilots in the time domain dimension of the original pilots; or when the Doppler shift and delay information of the channels is such that the Doppler shift values of the channels are below a second shift threshold and the delays of the channels are above a second time threshold, increasing, by the channel estimation device, the number of physical resource locations of the encrypted pilots in frequency domain dimension of the original pilots; and determining, by the channel estimation device, the set of physical resource locations of the encrypted pilots, according to the pilot pattern information, and the location information of the resources needed to be estimated comprises: determining, by the channel estimation device, according to the pilot pattern information and the location information of the resources needed to be estimated, physical resource locations distributed evenly in a region of the resources needed to be estimated as the physical resource locations of the encrypted pilots; or determining, by the channel estimation device, according to the pilot pattern information and the location information of the resources needed to be estimated, central locations of the physical resources of the original pilots for estimating the channel estimation values of the encrypted pilots, and determining physical resource locations at the central locations of the original pilots as the physical resource locations of the encrypted pilots.

5. The method according to claim 2, wherein determining, by the channel estimation device, the set of physical resource locations of the original pilots for estimating the encrypted pilots comprises:

determining, by the channel estimation device, a set of physical resource locations of all or a part of original pilots, correlation between which and the channels of the encrypted pilots satisfying a preset relationship, as the set of physical resource locations of the original pilots for estimating the encrypted pilots; and/or determining, by the channel estimation device, a preset set of physical resource locations of the original pilots as the set of physical resource locations of the original pilots for estimating the encrypted pilots.

6. The method according to claim 5, wherein determining, by the channel estimation device, the set of physical resource locations of all or a part of original pilots, correlation between which and the channels of the encrypted pilots satisfying the preset relationship, as the set of physical resource locations of the original pilots for estimating the encrypted pilots comprises:

when Doppler shift and delay information of the channels is such that the Doppler shift values of the channels are above a third shift threshold, and the delays of the channels are below a third time threshold, increasing, by the channel estimation device, the number of physical resource locations of the original pilots, for estimating the encrypted pilots, the correlation between which and the channels of the encrypted pilots satisfying the preset relationship, in the frequency domain dimension of the original pilots; or when the Doppler shift and delay information of the channels is such that the Doppler shift values of the channel are below a fourth shift threshold, and the delays of the channels are above a fourth time threshold, increasing, by the channel estimation device, the number of physical resource locations of the original pilots, for estimating the encrypted pilots, the correlation between which and the channels of the encrypted pilots satisfying the preset relationship, in the time domain dimension of the original pilots.

7. The method according to claim 2, wherein performing, by the channel estimation device, channel estimation on all the resources using the channel estimation values of the encrypted pilots through the one-dimension channel estimation to derive the channel estimation values over all the resources comprises:

when the set of physical resource locations $(k_{a_{ij}}, l_{a_{ij}})$ of the encrypted pilots coincides completely or partially with the set of physical resource locations $(k_{b_{ij}}, l_{b_{ij}})$ of the original pilots, performing, by the channel estimation device, channel estimation on all the resources using the channel estimation values $H'(k_{a_{ij}}, l_{a_{ij}})$ of the encrypted pilots through the one-dimension channel estimation to derive the channel estimation values over all the resources (k,l); or when the set of physical resource locations $(k_{a_{ij}}, l_{a_{ij}})$ of the encrypted pilots do not coincide with the set of physical resource locations $(k_{b_{ij}}, l_{b_{ij}})$ of the original pilots, performing, by the channel estimation device, channel estimation on all the resources using the channel estimation values $H'(k_{a_{ij}}, l_{a_{ij}})$ of the encrypted pilots and the channel estimation values $\hat{H}(k_{b_{ij}}, l_{b_{ij}})$ of the original pilots through the one-dimension channel estimation to derive the channel estimation values over all the resources (k,l).

8. The method according to claim 7, wherein:

the two-dimension channel estimation comprises channel estimation using two-dimension filtering interpolation in the time and frequency domains; and the one-dimension channel estimation comprises channel estimation using one-dimension cascaded filtering interpolation, channel estimation using one-dimension cascaded linear interpolation, or channel estimation using one-dimension cascaded hybrid linear and filtering interpolation, the one-dimension cascaded filtering interpolation comprises one-dimension cascaded filtering interpolation of firstly performing interpolation in the frequency domain and then performing interpolation in the time domain; or one-dimension cascaded filtering interpolation of firstly performing interpolation in the time domain and then performing interpolation in the frequency domain, the one-dimension cascaded linear interpolation comprises one-dimension cascaded linear interpolation of firstly performing linear interpolation in the frequency domain and then performing linear interpolation in the time domain; or one-dimension cascaded linear interpolation of firstly performing linear interpolation in the time domain and then performing linear interpolation in the frequency domain, and the one-dimension cascaded hybrid linear and filtering interpolation comprises one-dimension cascaded hybrid linear and filtering interpolations of firstly performing linear interpolation in the frequency domain and then performing filter interpolation in the time domain; of firstly performing filtering interpolation in the time domain and then performing linear interpolation in the frequency domain; of firstly performing filtering interpolation in the frequency domain and then performing linear interpolation in the time domain; or of firstly performing linear interpolation in the time domain and then performing filter interpolation in the frequency domain.

9. The method according to claim 2, wherein:

the two-dimension channel estimation comprises channel estimation using two-dimension filtering interpolation in the time and frequency domains; and the one-dimension channel estimation comprises channel estimation using one-dimension cascaded filtering interpolation, channel estimation using one-dimension cascaded linear interpolation, or channel estimation using one-dimension cascaded hybrid linear and filtering interpolation, the one-dimension cascaded filtering interpolation comprises one-dimension cascaded filtering interpolation of firstly performing interpolation in the frequency domain and then performing interpolation in the time domain; or one-dimension cascaded filtering interpolation of firstly performing interpolation in the time domain and then performing interpolation in the frequency domain, the one-dimension cascaded linear interpolation comprises one-dimension cascaded linear interpolation of firstly performing linear interpolation in the frequency domain and then performing linear interpolation in the time domain; or one-dimension cascaded linear interpolation of firstly performing linear interpolation in the time domain and then performing linear interpolation in the frequency domain, and the one-dimension cascaded hybrid linear and filtering interpolation comprises one-dimension cascaded hybrid linear and filtering interpolations of firstly performing linear interpolation in the frequency domain and then performing filter interpolation in the time domain; of firstly performing filtering interpolation in the time domain and then performing linear interpolation in the frequency domain; of firstly performing filtering interpolation in the frequency domain and then performing linear interpolation in the time domain; or of firstly performing linear interpolation in the time domain and then performing filter interpolation in the frequency domain.

10. The method according to claim 1, wherein:

the two-dimension channel estimation comprises channel estimation using two-dimension filtering interpolation in the time and frequency domains; and the one-dimension channel estimation comprises channel estimation using one-dimension cascaded filtering interpolation, channel estimation using one-dimension cascaded linear interpolation, or channel estimation using one-dimension cascaded hybrid linear and filtering interpolation, the one-dimension cascaded filtering interpolation comprises one-dimension cascaded filtering interpolation of firstly performing interpolation in the frequency domain and then performing interpolation in the time domain; or one-dimension cascaded filtering interpolation of firstly performing interpolation in the time domain and then performing interpolation in the frequency domain, the one-dimension cascaded linear interpolation comprises one-dimension cascaded linear interpolation of firstly performing linear interpolation in the frequency domain and then performing linear interpolation in the time domain; or one-dimension cascaded linear interpolation of firstly performing linear interpolation in the time domain and then performing linear interpolation in the frequency domain, and the one-dimension cascaded hybrid linear and filtering interpolation comprises one-dimension cascaded hybrid linear and filtering interpolations of firstly performing linear interpolation in the frequency domain and then performing filter interpolation in the time domain; of firstly performing filtering interpolation in the time domain and then performing linear interpolation in the frequency domain; of firstly performing filtering interpolation in the frequency domain and then performing linear interpolation in the time domain; or of firstly performing linear interpolation in the time domain and then performing filter interpolation in the frequency domain.

11. A channel estimation device, comprising:
a processor; and
a memory which stores a first channel estimation instruction and a second channel estimation instruction, wherein:

the first channel estimation instruction is executed by the processor to perform channel estimation on encrypted pilots using channel estimation values of original pilots by adopting two-dimension channel estimation approach to derive channel estimation values of the encrypted pilots; and the second channel estimation instruction is executed by the processor to perform channel estimation on all resources using the channel estimation values of the encrypted pilots by adopting one-dimension channel estimation approach to derive channel estimation values over all the resources.

12. The device according to claim 11, wherein:

the first channel estimation instruction is executed further by the processor to determine a set of physical resource locations $(k_{a_i}, l_{a_i})$ of the encrypted pilots, wherein k represents a resource index in frequency domain, l represents a resource index in time domain, a represents a resource index of an encrypted pilot, i={1, 2, ..., N}, and N represents the number of encrypted pilots;

to determine a set of physical resource locations $(k_{b_{i,j}}, l_{b_{i,j}})$ of the original pilots for estimating the set of physical resource locations $(k_{a_i}, l_{a_i})$ of the encrypted pilots, wherein k represents a resource index in frequency domain, l represents a resource index in time domain, a represents a resource index of an encrypted pilot, b represents a resource index of an original pilot for estimating the encrypted pilot, i={1, 2, ..., N}, N represents the number of encrypted pilots, j={1, 2, ..., $M_i$}, and $M_i$ represents the number of original pilots for estimating the encrypted pilots; and to perform channel estimation on each encrypted pilot using the channel estimation values of the original pilots by adopting two-dimension channel estimation approach to derive the channel estimation value of each encrypted pilot as $$H'(k_{a_i}, l_{a_i}) = P_{ft} \cdot \begin{bmatrix} \hat{H}(k_{b_{i,1}}, l_{b_{i,1}}) \\ M \\ \hat{H}(k_{b_{i,M_i}}, l_{b_{i,M_i}}) \end{bmatrix},$$

wherein $P_{ft}$ represents a two-dimension filter matrix based upon two-dimension channel estimation, and $\hat{H}(k_{b_{i,j}}, l_{b_{i,j}})$ represents the channel estimation values of the set of physical resource locations $(k_{b_{i,j}}, l_{b_{i,j}})$ of the original pilots.

13. The device according to claim 12, wherein:

the first channel estimation instruction is executed further by the processor to determine the set of physical resource locations of the encrypted pilots in one or any combination of the following approaches:

determining a preset set of physical resource locations of the encrypted pilots as the set of physical resource locations of the encrypted pilots;

determining the set of physical resource locations of the encrypted pilots, according to Doppler shift and delay information of channels;

determining the set of physical resource locations of the encrypted pilots, according to pilot pattern information, and location information of resources needed to be estimated.

14. The device according to claim 13, wherein:
the first channel estimation instruction is executed further by the processor, when the Doppler shift and delay information of the channels is such that the Doppler shift values of the channels are above a first shift threshold and the delays of the channels are below a first time threshold, to increase the number of physical resource locations of the encrypted pilots in time domain dimension of the original pilots; or when the Doppler shift and delay information of the channels is such that the Doppler shift values of the channels are below a second shift threshold and the delays of the channels are above a second time threshold, to increase the number of physical resource locations of the encrypted pilots in the frequency domain dimension of the original pilots; and
to determine, according to the pilot pattern information and the location information of the resources needed to be estimated, physical resource locations distributed evenly in a region of the resources needed to be estimated as the physical resource locations of the encrypted pilots; or to determine, according to the pilot pattern information and the location information of the resources needed to be estimated, central locations of the physical resources of the original pilots for estimating the channel estimation values of the encrypted pilots, and to determine physical resource locations at the central locations of the original pilots as the physical resource locations of the encrypted pilots.

15. The device according to claim 10, wherein:
the first channel estimation instruction is executed further by the processor to determine the set of physical resource locations of the original pilots for estimating the encrypted pilots in the following approaches:
determining a set of physical resource locations of all or a part of original pilots, correlation between which and the channels of the encrypted pilots satisfying a preset relationship, as the set of physical resource locations of the original pilots for estimating the encrypted pilots;
determining a preset set of physical resource locations of the original pilots as the set of physical resource locations of the original pilots for estimating the encrypted pilots.

16. The device according to claim 15, wherein:
the first channel estimation instruction is executed further by the processor, when Doppler shift and delay information of the channels is such that the Doppler shift values of the channels are above a third shift threshold, and the delays of the channels are below a third time threshold, to increase the number of physical resource locations of the original pilots, for estimating the encrypted pilots, the correlation between which and the channels of the encrypted pilots satisfying the preset relationship, in the frequency domain dimension of the original pilots; or
when the Doppler shift and delay information of the channels is such that the Doppler shift values of the channels are below a fourth shift threshold, and the delays of the channels are above a fourth time threshold, to increase the number of physical resource locations of the original pilots, for estimating the encrypted pilots, the correlation between which and the channels of the encrypted pilots satisfying the preset relationship, in the time domain dimension of the original pilots.

17. The device according to claim 12, wherein:
the second channel estimation instruction is executed further by the processor, when the set of physical resource locations $(k_{a_{ij}}, l_{a_{ij}})$ of the encrypted pilots coincides completely or partially with the set of physical resource locations $(k_{b_{ij}}, l_{b_{ij}})$ of the original pilots, to perform channel estimation on all the resources using the channel estimation values $H'(k_{a_{ij}}, l_{a_{ij}})$ of the encrypted pilots through the one-dimension channel estimation to derive the channel estimation values over all the resources; or
when the set of physical resource locations $(k_{a_{ij}}, l_{a_{ij}})$ of the encrypted pilots do not coincide with the set of physical resource locations $(k_{b_{ij}}, l_{b_{ij}})$ of the original pilots, to perform channel estimation on all the resources using the channel estimation values $H'(k_{a_{ij}}, l_{a_{ij}})$ of the encrypted pilots and the channel estimation values $\hat{H}(k_{b_{ij}}, l_{b_{ij}})$ of the original pilots through the one-dimension channel estimation to derive the channel estimation values over all the resources.

18. The device according to claim 17, wherein:
the two-dimension channel estimation comprises channel estimation using two-dimension filtering interpolation in the time and frequency domains; and
the one-dimension channel estimation comprises channel estimation using one-dimension cascaded filtering interpolation, channel estimation using one-dimension cascaded linear interpolation, or channel estimation using one-dimension cascaded hybrid linear and filtering interpolation,
the one-dimension cascaded filtering interpolation comprises one-dimension cascaded filtering interpolation of firstly performing interpolation in the frequency domain and then performing interpolation in the time domain; or one-dimension cascaded filtering interpolation of firstly performing interpolation in the time domain and then performing interpolation in the frequency domain,
the one-dimension cascaded linear interpolation comprises one-dimension cascaded linear interpolation of firstly performing linear interpolation in the frequency domain and then performing linear interpolation in the time domain; or one-dimension cascaded linear interpolation of firstly performing linear interpolation in the time domain and then performing linear interpolation in the frequency domain, and
the one-dimension cascaded hybrid linear and filtering interpolation comprises one-dimension cascaded hybrid linear and filtering interpolations of firstly performing linear interpolation in the frequency domain and then performing filtering interpolation in the time domain; of firstly performing filtering interpolation in the time domain and then performing linear interpolation in the frequency domain; of firstly performing filter interpolation in the frequency domain and then performing linear interpolation in the time domain; or of firstly performing linear interpolation in the time domain and then performing filter interpolation in the frequency domain.

19. The device according to claim 12, wherein:
the two-dimension channel estimation comprises channel estimation using two-dimension filtering interpolation in the time and frequency domains; and
the one-dimension channel estimation comprises channel estimation using one-dimension cascaded filtering interpolation, channel estimation using one-dimension cascaded linear interpolation, or channel estimation using one-dimension cascaded hybrid linear and filtering interpolation,
the one-dimension cascaded filtering interpolation comprises one-dimension cascaded filtering interpolation of firstly performing interpolation in the frequency domain and then performing interpolation in the time domain; or one-dimension cascaded filtering interpolation of firstly performing interpolation in the time domain and then performing interpolation in the frequency domain, the one-dimension cascaded linear interpolation comprises one-dimension cascaded linear interpolation of firstly performing linear interpolation in the frequency domain and then performing linear interpolation in the time domain; or one-dimension cascaded linear interpolation of firstly performing linear interpolation in the time domain and then performing linear interpolation in the frequency domain, and the one-dimension cascaded hybrid linear and filtering interpolation comprises one-dimension cascaded hybrid linear and filtering interpolations of firstly performing linear interpolation in the frequency domain and then performing filtering interpolation in the time domain; of firstly performing filtering interpolation in the time domain and then performing linear interpolation in the frequency domain; of firstly performing filter interpolation in the frequency domain and then performing linear interpolation in the time domain; or of firstly performing linear interpolation in the time domain and then performing filter interpolation in the frequency domain.

20. The device according to claim 11, wherein:

the two-dimension channel estimation comprises channel estimation using two-dimension filtering interpolation in the time and frequency domains; and the one-dimension channel estimation comprises channel estimation using one-dimension cascaded filtering interpolation, channel estimation using one-dimension cascaded linear interpolation, or channel estimation using one-dimension cascaded hybrid linear and filtering interpolation, the one-dimension cascaded filtering interpolation comprises one-dimension cascaded filtering interpolation of firstly performing interpolation in the frequency domain and then performing interpolation in the time domain; or one-dimension cascaded filtering interpolation of firstly performing interpolation in the time domain and then performing interpolation in the frequency domain, the one-dimension cascaded linear interpolation comprises one-dimension cascaded linear interpolation of firstly performing linear interpolation in the frequency domain and then performing linear interpolation in the time domain; or one-dimension cascaded linear interpolation of firstly performing linear interpolation in the time domain and then performing linear interpolation in the frequency domain, and the one-dimension cascaded hybrid linear and filtering interpolation comprises one-dimension cascaded hybrid linear and filtering interpolations of firstly performing linear interpolation in the frequency domain and then performing filtering interpolation in the time domain; of firstly performing filtering interpolation in the time domain and then performing linear interpolation in the frequency domain; of firstly performing filter interpolation in the frequency domain and then performing linear interpolation in the time domain; or of firstly performing linear interpolation in the time domain and then performing filter interpolation in the frequency domain.

\* \* \* \* \*